(12) United States Patent
Anand et al.

(10) Patent No.: US 9,163,561 B2
(45) Date of Patent: Oct. 20, 2015

(54) POWER PLANT EMISSIONS REDUCTION

(71) Applicant: General Electric Company, Schenectady, NY (US)

(72) Inventors: Ashok Kumar Anand, Schenectady, NY (US); Thirumala Reddy Nagarjuna Reddy, Bangalore (IN)

(73) Assignee: GENERAL ELECTRIC COMPANY, SCHENECTADY, NY (US)

( * ) Notice: Subject to any disclaimer, the term of this patent is extended or adjusted under 35 U.S.C. 154(b) by 394 days.

(21) Appl. No.: 13/662,816

(22) Filed: Oct. 29, 2012

(65) Prior Publication Data
US 2014/0116023 A1 May 1, 2014

(51) Int. Cl.
F02C 3/34 (2006.01)
F02C 3/30 (2006.01)

(52) U.S. Cl.
CPC ... F02C 3/30 (2013.01); F02C 3/34 (2013.01); Y02E 20/16 (2013.01)

(58) Field of Classification Search
CPC .............. F02C 3/30; F02C 3/34; Y02E 20/16
USPC ..................... 60/39.52, 39.59, 775
See application file for complete search history.

(56) References Cited

U.S. PATENT DOCUMENTS

| 4,928,478 | A | 5/1990 | Maslak |
| 6,256,976 | B1 | 7/2001 | Kataoka et al. |
| 6,363,709 | B2 | 4/2002 | Kataoka et al. |
| 7,162,864 | B1 | 1/2007 | Schefer et al. |
| 7,926,256 | B2 | 4/2011 | Draper et al. |
| 2002/0100271 | A1* | 8/2002 | Viteri et al. ............... 60/39.182 |
| 2005/0076645 | A1* | 4/2005 | Frutschi et al. ............... 60/772 |
| 2009/0284013 | A1 | 11/2009 | Anand et al. |
| 2010/0107592 | A1 | 5/2010 | Botero et al. |
| 2010/0126181 | A1* | 5/2010 | Ranasinghe et al. ........... 60/782 |
| 2011/0138766 | A1 | 6/2011 | ElKady et al. |
| 2011/0289930 | A1 | 12/2011 | Draper |
| 2012/0036860 | A1 | 2/2012 | Wettstein et al. |
| 2012/0098276 | A1 | 4/2012 | Kraemer et al. |

* cited by examiner

*Primary Examiner* — Ehud Gartenberg
*Assistant Examiner* — Filippo Manfredi
(74) *Attorney, Agent, or Firm* — Dority & Manning, PA

(57) ABSTRACT

A system for improved emissions performance of a power plant generally includes an exhaust gas recirculation system having an exhaust gas compressor disposed downstream from the combustor, a condensation collection system at least partially disposed upstream from the exhaust gas compressor, and a mixing chamber in fluid communication with the exhaust gas compressor and the condensation collection system, where the mixing chamber is in fluid communication with the combustor.

20 Claims, 3 Drawing Sheets

POWER PLANT EMISSIONS REDUCTION

FEDERAL RESEARCH STATEMENT

This invention was made with Government support under Contract No. DE-FC26-05NT42643, awarded by the Department of Energy. The Government may have certain rights in the invention.

FIELD OF THE INVENTION

The present invention generally involves a power plant. More particularly, the invention relates to a system for reducing emissions of a gas turbine.

BACKGROUND OF THE INVENTION

Gas turbines are widely used in industrial and power generation operations. A typical gas turbine may include a compressor section, a combustor downstream from the compressor section, and a turbine section downstream from the combustor. A working fluid such as ambient air flows into the compressor section where it is compressed before flowing into the combustor. The compressed working fluid is mixed with a fuel and burned within the combustor to generate combustion gases having a high temperature, pressure, and velocity. The combustion gases flow from the combustor and expand through the turbine section to rotate a shaft and to produce work. The combustion gases are then exhausted from the turbine section. In particular gas turbine designs, an exhaust gas recovery system may be positioned downstream from the turbine section.

The compressed working fluid typically contains an excess quantity of oxygen relative to the amount of oxygen required to support the combustion process. As a result, flame temperatures within the combustor may be elevated, thereby increasing thermal stresses within the combustor and/or the turbine section of the gas turbine. In addition, elevated flame temperatures may produce various undesirable emissions, including but not limited to, nitrous oxides (hereinafter NOx), and may also produce other inert components such as nitrogen and water vapor within the exhausted combustion gases.

Typical hydrocarbon fuels used to power modern gas turbines generally include natural gas and oil. However, the supply of hydrocarbon based fuels is generally limited as a non-renewable resource. As a result, high-hydrogen content fuels such as synthetic gas (herein referred to as "syngas") have been developed as an alternative to the hydrocarbon based fuels. One issue with burning high-hydrogen content fuels, as with burning hydrocarbon based fuels within modern gas turbines, is that undesirable levels of thermal NOx are produced during the combustion process. In addition, the exhaust gases resulting from burning high-hydrogen based fuels contain large concentrations of water vapor.

Various methods are known in the art for reducing the flame temperature and/or the production of NOx within the combustor. One known method includes decreasing the oxygen content of the compressed working fluid prior to combustion by capturing at least a portion of the combustion exhaust gases flowing from the turbine section which have a lower oxygen level than the compressed ambient air entering the compressor, and recirculating the exhaust gas into the compressor and/or into the combustor. As a result, the high oxygen content of the compressed working fluid may be diluted with the low oxygen content exhaust gases, while still providing sufficient oxygen in the working fluid to the combustor in order to support combustion. Other known methods for decreasing the flame temperature and/or reducing NOx production include injecting various diluents such as water or steam into a combustion zone within the combustor.

Although known methods for reducing flame temperatures within a gas turbine are somewhat effective, the allowable levels of emissions such as, but not limited to, NOx that may be emitted by a gas turbine continue to be heavily regulated. Therefore, an improved system and method for further reducing flame temperatures and/or emissions such as NOx within a gas turbine, in particular in gas turbines that burn high-hydrogen fuels would be useful.

BRIEF DESCRIPTION OF THE INVENTION

Aspects and advantages of the invention are set forth below in the following description, or may be obvious from the description, or may be learned through practice of the invention.

One embodiment of the present invention is a system for improved emissions performance of a power plant. The power plant includes a combustor and an exhaust gas recirculation system having an exhaust gas compressor downstream from the combustor. The exhaust gas recirculation system receives an exhaust gas from the combustor. A condensation collection system is positioned upstream from the exhaust gas compressor. A mixing chamber is in fluid communication with the exhaust gas compressor and the condensation collection system, and the mixing chamber is in fluid communication with the combustor.

Another embodiment of the present invention is a power plant having a gas turbine. The gas turbine includes a compressor section, a combustor downstream from the compressor section, a fuel supply system in fluid communication with the combustor, and a turbine section downstream from the combustor. An exhaust gas recirculation system is downstream from the gas turbine and configured to receive a combustion exhaust gas from the gas turbine. The exhaust gas recirculation system generally includes an exhaust gas compressor. A condensation collection system is at least partially disposed upstream from the exhaust gas compressor. A mixing chamber is in fluid communication with the exhaust gas compressor and the condensation collection system. The mixing chamber may be in fluid communication with at least one of the compressor section, the combustor, or the fuel supply system.

The present invention may also include a method for improved emissions performance of a gas turbine having a compressor section, a combustor, a turbine section and a fuel supply system. The method generally includes transferring an exhaust gas from the turbine section to a condensation collection system, condensing water vapor from the exhaust gas, compressing the exhaust gas, and flowing the compressed exhaust gas and the condensed water vapor to a mixing chamber. The method further includes remixing the condensed water vapor and the compressed exhaust gas to produce a re-moisturized exhaust gas, and flowing the re-moisturized exhaust gas to at least one of the fuel supply system, the compressor section or the combustor of the gas turbine.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
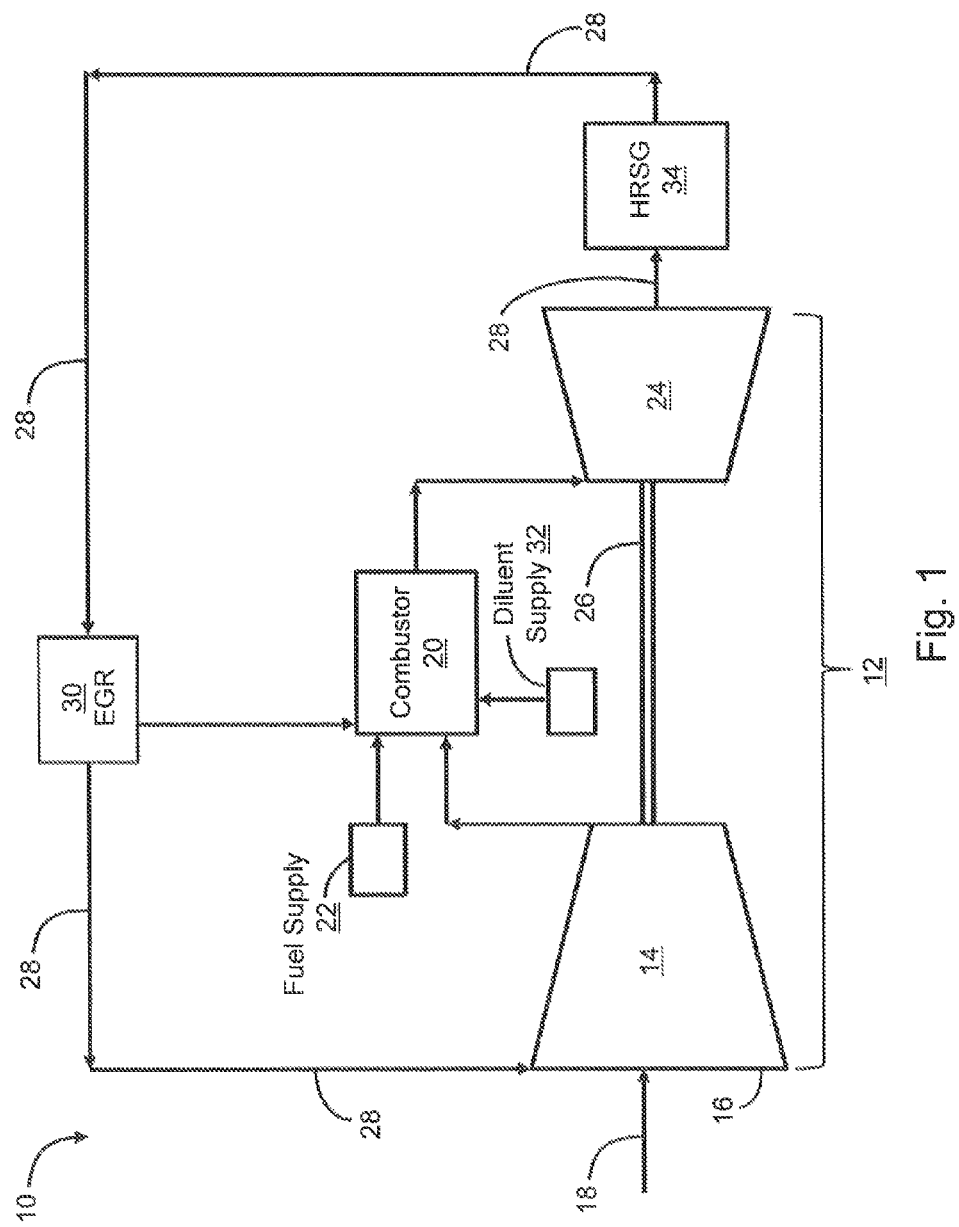
FIG. 1 illustrates a schematic of a portion of a typical power plant.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. In addition, the terms "upstream" and "downstream" refer to the relative location of components in a fluid pathway. For example, component A is upstream from component B if a fluid flows from component A to component B. Conversely, component B is downstream from component A if component B receives a fluid flow from component A.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Various embodiments of the present invention include a system for improving emissions performance of a combustor used in a power plant such as a gas turbine or a steam turbine power plant. In particular embodiments, the system generally includes an exhaust gas recirculation system configured to receive at least a portion of a combustion exhaust gas that flows from a gas turbine. The exhaust gas recirculation system recirculates the exhaust gas back to the gas turbine so as to provide a lower oxygen content working fluid to the combustor. The exhaust gas recirculation system generally includes an exhaust gas compressor for compressing the recirculating exhaust gas. The system also includes a condensation collection system having a heat exchanger or other device for condensing moisture such as water vapor from the recirculating exhaust gas upstream from the exhaust gas compressor. A mixing chamber is positioned downstream from the exhaust gas compressor and the condensation collection system. In particular embodiments, the mixing chamber is in fluid communication with a fuel supply that supplies a fuel to the gas turbine combustor.

In operation, the combustion exhaust gas flowing from the gas turbine exhaust and into the exhaust gas recirculation system generally contains various amounts of water vapor depending on the type of fuel used in the combustion process. In addition, the oxygen content of the exhaust gas may be significantly reduced due to the combustion process. The exhaust gas flows through the condensation collection system where the water vapor condenses form the exhaust and is removed so as to provide a de-moisturized exhaust gas. The condensate is collected and pumped to the mixing chamber. The de-moisturized exhaust gas flows through the exhaust gas compressor and to the mixing chamber. The condensate and the de-moisturized exhaust gas is combined within the mixing chamber, thereby resulting in a re-moisturized exhaust gas. In addition, the condensate may remove heat from the compressed exhaust gas. In particular embodiments, the re-moisturized exhaust gas is mixed with fuel from a fuel supply system. The fuel and the re-moisturized exhaust gas may flow to the combustor of the gas turbine. As a result, the Flame temperature and/or the production of undesirable emissions such as, but not limited to, nitrogen oxides (NOx) is decreased, thereby improving the emissions performance of the gas turbine.

Referring now to the drawings, FIG. 1 illustrates a schematic of a typical power plant 10. As shown, the power plant 10 generally includes a gas turbine 12. The gas turbine 12 generally includes a compressor section 14 having an inlet 16 for receiving a working fluid 18 such as ambient air. The working fluid 18 is compressed as it flows through the compressor section 14 and into a combustor 20 downstream from the compressor section 14. Although a single combustor 20 is shown, it should be known by one of ordinary skill in the art that the gas turbine 12 may include a plurality of combustors generally arranged in an annular pattern about an axial centerline of the gas turbine 12.

A fuel supply system 22 in fluid communication with the combustor 20 supplies a fuel to the combustor 20. The compressed working fluid 18 is mixed with the fuel to form a combustible mixture within the combustor 20. The combustible mixture is burned within a combustion zone of the combustor 20, thereby generating combustion gases having a high temperature, pressure, and velocity. The combustion gases flow from the combustor 20 and rapidly expand through a turbine section 24 downstream from the combustor 20. The combustion gases impart kinetic and thermal energy to one or more rows of rotatable blades (not shown) coupled to a shaft 26, thereby causing the shaft 26 to rotate and produce mechanical work. The shaft 26 may be coupled to a load such as the compressor section 14 to support the combustion process and/or to a generator (not shown) to produce electricity. The combustion gases flow out of the turbine section 24 as an exhaust gas 28.

As shown in FIG. 1, the power plant 10 may further include an exhaust gas recirculation system 30 (herein referred to as the "EGR system 30") downstream from the turbine section 24. The EGR system 30 may receive at least a portion of the exhaust gas 28 from the gas turbine 12 and then recirculate the exhaust gas 28 back to the gas turbine 12. The exhaust gas 28 may be introduced back into the gas turbine 12 at any point between the inlet 16 of the compressor section 14 and the turbine section 24. In particular embodiments, the exhaust gas 28 flows from the EGR system 30 to one or more of the compressor section 14, the combustor 20 or the fuel supply system 22. The exhaust gas 28 may flow from the gas turbine to the EGR system 30 and back to the gas turbine 12 through a series of exhaust ducts, conduits, tubes, pipes or any fluid coupling suitable to flow the exhaust gas 28 from the gas turbine 12, through the EGR system 30 and back to the gas turbine 12 at various gaseous states, temperatures and pressures.

In particular embodiments, as shown in FIG. 1, the power plant 10 includes a diluent supply system 32 in fluid communication with the combustor 20. The diluent supply system 32 may provide a diluent such as an oxidizer, water, steam or an inert gas such as nitrogen to the combustor 20 to support the combustion process and/or to reduce undesirable emissions such as nitrogen oxides (NOx).

In further embodiments, the power plant 10 includes a heat recovery steam generation system 34 (herein referred to as the "HRSG system 34"). Generally, the HRSG system 34 may be disposed between the turbine section 24 of the gas turbine 12 and the EGR system 30. In this manner, the exhaust gas 28 from the gas turbine 12 may flow through the HRSG system 34 where heat may be transferred from the exhaust gas 28 to generate steam. The steam may be used to power a steam turbine (not shown) such as in a combined cycle power plant, or for other auxiliary purposes such as cooling various portions of the gas turbine 12 such as the turbine section 24 and/or the combustor 20.

Figure 2:
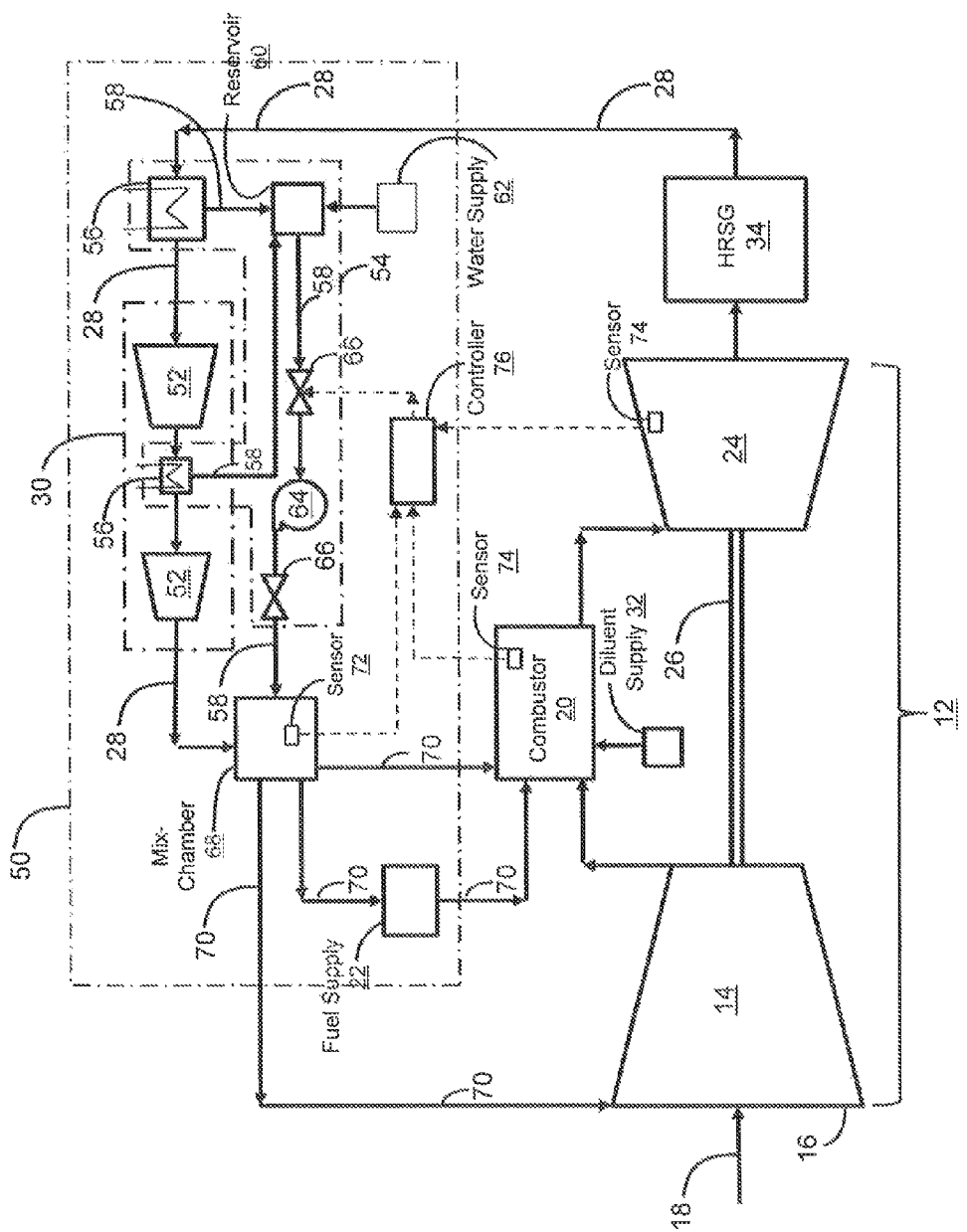
FIG. 2 illustrates a schematic of a system for improving the emissions performance of the power plant according to at least one embodiment of the present disclosure as applied using a gas turbine.

Now referring to FIG. 2 which provides a schematic of the power plant 10 including a system 50 (herein referred to as "the system 50") for improving the emissions performance of the power plant 10 and/or the gas turbine 12. As shown, the system 50 generally includes the EGR system 30 as previously presented in FIG. 1. As shown in FIG. 2, the EGR system 30 generally includes an exhaust gas compressor 52 for compressing the exhaust gas 28 flowing from the gas turbine 12. It should be appreciated by one of ordinary skill in the art that the exhaust gas compressor 52 may be any type of compressor known in the art that is suitable for compressing the exhaust gas 28 at various gaseous states, temperatures and pressures. For example, the exhaust gas compressor 52 may be an axial flow compressor. In alternate embodiments, the EGR system 30 may include a plurality of exhaust gas compressors 52 for compressing the exhaust gas 28. The plurality of exhaust gas compressors 52 may be staged in series as shown, or in parallel (not shown) so as to achieve a desired compression ratio.

As shown in FIG. 2, the system 50 further includes a condensation collection system 54. In particular embodiments, the condensation collection system 54 may be disposed at least partially downstream from the gas turbine 12 and upstream from the exhaust gas compressor 52 of the EGR system 30. In various embodiments, the condensation collection system 54 may be a standalone system. In alternate embodiments, the condensation collection system 54 may be incorporated into the EGR system 30.

In particular embodiments, the condensation collection system 54 includes a heat exchanger 56. The heat exchanger 56 may be any type of heat exchanger known in the industry such as a shell and tube type heat exchanger. The heat exchanger 56 may be disposed in the flow path of the exhaust gas 28 flowing between the gas turbine 12 and the exhaust gas compressor 52 of the EGR system 30. In this manner, the heat exchanger 56 may reduce the temperature of the exhaust gas 28, thereby forming a condensate 58 by condensing water vapor and other particulates from the exhaust gas 28 before it flows into the exhaust gas compressor 52. As used herein, the term "condensate" may include liquid water, steam or any other liquid condensed from the exhaust gas 28. As a result, the energy required to compress the exhaust gas 28 may be reduced relative to the energy required to compress an exhaust gas having higher moisture content, thus resulting in improved overall efficiency of the power plant 10.

In particular embodiments, the condensation collection system 54 includes a second heat exchanger 56 disposed between a first and a second exhaust gas compressor 52 of the EGR system 30. In this manner, moisture content of the exhaust gas 28 may be further reduced before flowing into the second exhaust gas compressor 52, thereby further reducing the energy required to compress the exhaust gas 28 at a next stage of compression, thus resulting in improved overall efficiency of the power plant 10.

It should be appreciated by one of ordinary skill in the art that the condensation collection system 54 may include any device known in the art for separating moisture from the exhaust gas 28 and should not be limited to a heat exchanger. For example, the condensation collection system 54 may include a gas scrubber, dryer or other device which may also result in the condensation of moisture from the exhaust gas 28. In addition, it should be appreciated that the condensation collection system 54 may include a plurality of heat exchangers or other devices or any combination of both disposed at various positions upstream from and interposed at various points within the EGR system 54 for reducing the moisture content of the exhaust gas 28 flowing to the exhaust gas compressor 52 of the EGR system 54.

The condensation collection system 54 may further include a reservoir 60 in fluid communication with the heat exchanger 56 for collecting the condensate 58 from the exhaust gas 28. In alternate embodiments, the reservoir 60 is in fluid communication with an external water supply 62 so as to supplement the condensate 58 collected from the exhaust gases 28. In particular embodiments, a fluid pump 64 is in fluid communication with at least one of the reservoir 60 or the heat exchanger 56. The fluid pump 64 may be fluidly connected to the heat exchanger 56 or the reservoir 60 through a series of fluid couplings such as, but not limited to, pipes or other fluid conduits. The fluid pump 64 may be of any type known in the art suitable to transfer the condensate 58 from the heat exchanger 56 and/or the reservoir 60.

The condensation collection system 54 may further include a flow control valve 66 disposed downstream from the reservoir 60 and/or the heat exchanger 56. The flow control valve 66 may be actuated to reduce, increase or stop the flow of the condensate 58 from the heat exchanger 56 and/or the reservoir 60. In particular embodiments, the flow control valve 66 is disposed upstream from the fluid pump 64. In alternate embodiments, the flow control valve 66 is disposed downstream from the fluid pump 64. In certain embodiments, the condensation collection system 54 includes a plurality of the flow control valves 66 disposed upstream and/or downstream from the fluid pump 64.

As further illustrated in FIG. 2, the system 50 includes a mixing chamber 68 in fluid communication with the EGR system 30 and the condensation collection system 54. The mixing chamber 68 may include, but should not be limited to, a tank, vessel, container, mixing manifold, gas saturation unit or the like known in the art that is suitable for mixing a gas and a liquid. In particular embodiments, the exhaust gas 28 and the condensate 58 flow into the mixing chamber 68 and are recombined to produce a re-moisturized exhaust gas 70. In particular embodiments, the mixing chamber 68 may be in fluid communication with at least one of the fuel supply system 22, the compressor section 14 or the combustor 20 of the gas turbine 10. The mixing chamber 68 may be fluidly connected to at least one of the fuel supply system 22, the compressor section 14 or the combustor 20 of the gas turbine 12 through a series of conventional fluid couplings such as pipes, conduits and/or flow distribution manifolds.

The system 50 may further include a moisture sensor 72. In particular embodiments, the moisture sensor 72 is disposed within the mixing chamber 68. In the alternative, the moisture sensor 72 may be disposed at any point downstream from the mixing chamber 68. For example, the moisture sensor may disposed between the mixing chamber 68 and at least one of the fuel supply system 22, the compressor section 14 or the combustor 20 of the gas turbine 12.

In particular embodiments, the moisture sensor 72 is configured to detect the moisture content of the re-moisturized exhaust gas 70. In addition, the moisture sensor 72 may be configured to detect other parameters within the mixing chamber 68 such as pressure, temperature and flow rate of the re-moisturized exhaust gas 70. It should be appreciated by one skilled in the art that the system 50 may include a plurality of the moisture sensors 72 disposed within the mixing chamber 68 and/or at any point downstream from the mixing chamber 68. For example, the moisture sensors 72 may be disposed at any point between the mixing chamber 68 and at least one of the fuel supply system 22, the compressor section 14 or the combustor 20 of the gas turbine 12.

In various embodiments, an emissions sensor 74 is disposed in at least one of the combustor 20 or the turbine section 24 of the gas turbine 12. The emissions sensor 74 may be configured to detect various emissions components such as, but not limited to, NOx levels within the combustion gases and/or the exhaust gases 28 flowing from the gas turbine 12. In addition, the emissions sensor 74 may be configured to detect temperature and/or pressure of the combustion gases and/or the exhaust gases 28 flowing through the gas turbine 12. In certain embodiments, a plurality of the emissions sensors 74 may be disposed within at least one of the combustor 20 or the turbine section 24.

The moisture sensor 72 and/or the emissions sensor 74 may be connected to a controller 76. The controller 76 may include any turbine control or power plant control system known in the art that permits the gas turbine 12 and/or the power plant 10 to be controlled and/or operated as described herein. Generally, the controller 76 may comprise any computer system having a processor(s) that executes programs, such as computer readable instructions stored in the controller's memory, to control the operation of the gas turbine 12 and/or the power plant 10 using sensor inputs and instructions from human operators.

The controller 76 may be configured to receive and process a signal from one or both of the moisture sensor 72 and the emissions sensor 74. The controller 76 may generate a command signal based on the signal received from the moisture sensor 72 and/or the emissions sensor 74. The command signal generated by the controller 76 may manipulate actuators and/or other mechanical or electromechanical devices coupled to the gas turbine 12, the fuel supply system 22 and/or to the system 50 to regulate fluid flow so as to satisfy performance objectives while complying with operational boundaries of the power plant 10 and/or the gas turbine 12.

In particular embodiments, the controller 76 is connected to the flow control valve 66 of the condensation collection system 54. In this manner, the controller 76 may actuate the flow control valve 66 to control the flow of the condensate 58 flowing to the mixing chamber 68 based on sensed emissions levels such as the levels of NOx detected within the combustion gases and/or the exhaust gases 28 flowing through the gas turbine 12. For example, if undesirable levels of NOx are detected, the controller 76 may increase the flow of the condensate 58 flowing to the mixing chamber 68, thereby increasing moisture content of the re-moisturized exhaust gas 28. As a result, the flame temperature within the combustor 20 may be decreased, thereby resulting in reduced levels of undesirable emissions such as NOx.

Figure 3:
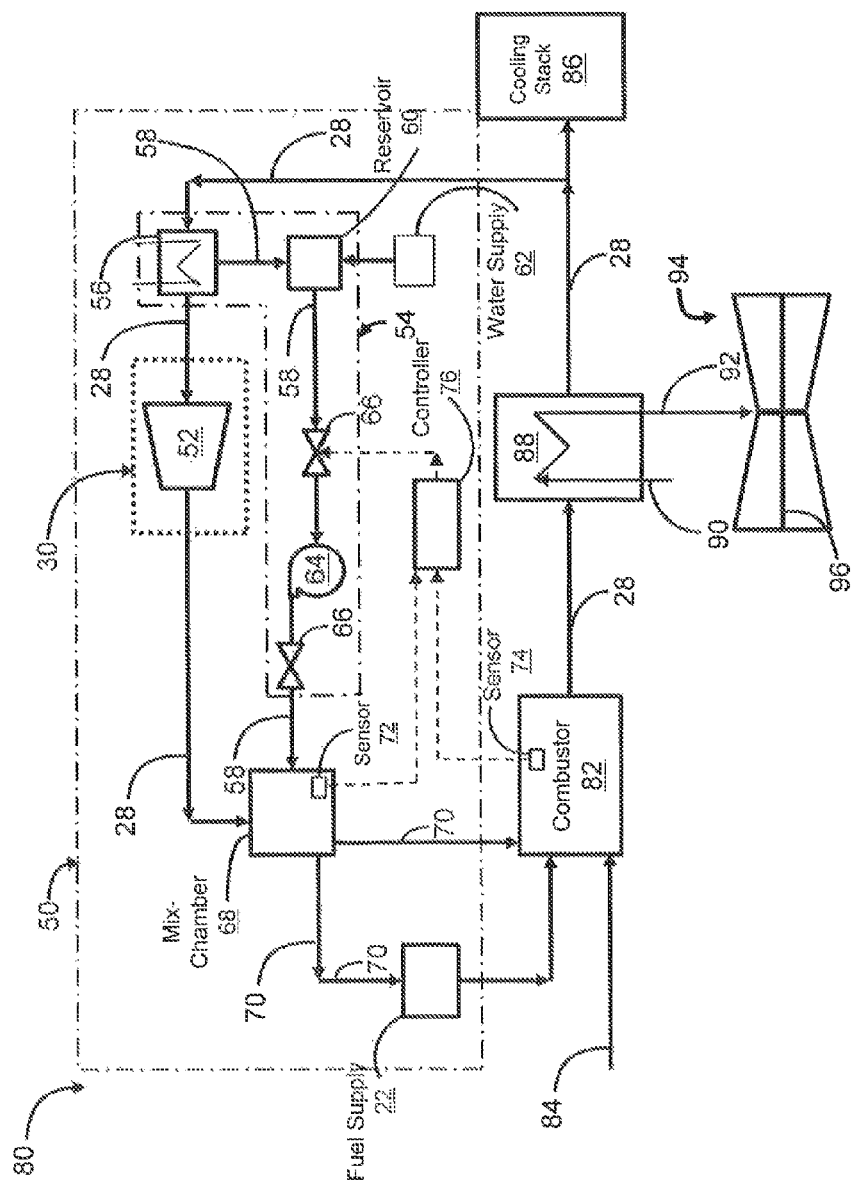
FIG. 3 illustrates a schematic of a system for improving the emissions performance of the power plant according to yet another embodiment of the present disclosure as applied using a steam turbine.

In alternate embodiments, as shown in FIG. 3, the system 50 may be employed within a steam turbine power plant 80. As shown, the steam power plant 80 generally includes a combustor 82. The combustor 82 includes an inlet 84 for receiving air for combustion. The fuel supply system 22 provides a fuel to the combustor 82. The fuel and air are combined and burned in the combustor 82 to generate the hot exhaust gas 28 as discussed above. The exhaust gas 28 flows from the combustor 82 through a heat exchanger 88 positioned downstream from the combustor 82. Thermal energy is transferred from the exhaust gas 28 to water 90 or water vapor flowing though the heat exchanger 88, thereby generating steam 92. The steam 92 flows to a steam turbine 94 to rotate a rotor shaft 96 coupled to a load such as a generator (not shown). At least a portion of the exhaust gas 28 may be directed from the heat exchanger to a cooling stack 86 or other system within the steam turbine power plant 80.

The exhaust gas 28 flows downstream from the heat exchanger 88 to the system 50. In this configuration, the exhaust gas 28 flows through the condensation collection system 54 where moisture is separated from the exhaust gas 28 and collected in the condensate reservoir 60 as previously described. The exhaust gas 28 flows through a low pressure compressor 52 such as a fan. The exhaust gas 28 and the condensate 58 flow into the mixing chamber 68 where they are recombined to form the re-moisturized exhaust gas 70 as previously described. The re-moisturized exhaust gas 70 is directed to the fuel supply system 22 or to the combustor 82 to reduce NOx emissions produced by the combustor 82 and/or to improve overall performance of the steam turbine power plant 80.

The embodiments shown in FIG. 2 may also provide a method for improving emissions performance of the gas turbine 12 and/or the power plant 10, 80. The method generally includes flowing the exhaust gas 28 from the turbine section 24 or the combustor 82 through the condensation collection system 54, and condensing water vapor from the exhaust gas 28. The method further includes compressing the exhaust gas 28, and flowing the compressed exhaust gas 28 to the mixing chamber 68. The method further includes flowing the condensed water vapor 58 from the condensation collection system 54 into the mixing chamber 68 and remixing the compressed exhaust gas 28 with the condensate 58 so as to produce a re-moisturized exhaust gas 70. The method also includes flowing the re-moisturized exhaust gas 70 to at least one of the fuel supply system 22, the compressor section 14 or the combustor 20 of the gas turbine or to the combustor 82 of the steam turbine system 80. In particular embodiments, the method may further include sensing emissions levels within the combustor 20, 82 or the turbine section 24, and controlling a flow rate of the condensed water vapor flowing to the mixing chamber based on the sensed emissions levels.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal language of the claims.

What is claimed is:

1. A method for improved emissions performance of a gas turbine having a compressor section, a combustor, a turbine section and a fuel supply system, the method comprising:

a. flowing an exhaust gas from the turbine section through a condensation collection system;

b. condensing water vapor from the exhaust gas via the condensation collection system to provide a de-moisturized exhaust gas downstream from the condensation collection system;
c. progressively compressing the de-moisturized exhaust gas via an axial flow compressor;
d. flowing the compressed de-moisturized exhaust gas and the condensed water vapor to a mixing chamber;
e. remixing the condensed water vapor and the compressed de-moisturized exhaust gas to produce a re-moisturized exhaust gas; and
f. flowing the re-moisturized exhaust gas to at least one of the fuel supply system, the compressor section or the combustor of the gas turbine.

2. The method as in claim 1, further comprising sensing emissions levels within at least one of the combustor or the turbine section of the gas turbine.

3. The method as in claim 2, further comprising controlling a flow rate of the condensed water vapor flowing to the mixing chamber in response to the sensed emissions levels.

4. A system for improved emissions performance of a power plant, comprising:
   a condensation collection system having a first heat exchanger disposed downstream from a combustor and a condensate reservoir in fluid communication with the first heat exchanger, wherein the first heat exchanger condenses water vapor from combustion exhaust gases flowing from the combustor into the condensate reservoir and provides a de-moisturized exhaust gas downstream from the first heat exchanger;
   an exhaust gas recirculation system including a first axial flow compressor disposed immediately downstream from the first heat exchanger, wherein the first axial flow compressor progressively compresses the de-moisturized exhaust gas and provides a compressed de-moisturized exhaust gas downstream of the first axial flow compressor; and
   a mixing chamber disposed downstream from the first axial flow compressor, in fluid communication with the condensate reservoir and in direct fluid communication with the combustor, wherein the compressed de-moisturized exhaust gas and the condensate from the condensate reservoir are mixed within the mixing chamber to provide a compressed re-moisturized exhaust gas directly to the combustor.

5. The system as in claim 4, further comprising an external water supply in fluid communication with at least one of the condensation collection system or the mixing chamber.

6. The system as in claim 4, wherein the condensation collection system comprises a second heat exchanger disposed downstream from the first axial flow compressor and upstream from the mixing chamber, wherein the second heat exchanger is in fluid communication with the condensate reservoir.

7. The system as in claim 6, wherein the exhaust gas recirculation system further comprises a second axial flow compressor disposed downstream from the second heat exchanger and upstream from the mixing chamber.

8. The system as in claim 4, further comprising a fuel supply system downstream from the mixing chamber and upstream from the combustor, wherein the fuel supply system provides fluid communication between the mixing chamber and the combustor.

9. The system as in claim 4, wherein the power plant comprises a compressor disposed immediately upstream from the combustor and downstream from the mixing chamber, the mixing chamber being in direct fluid communication with the compressor downstream from an inlet to the compressor and upstream from the combustor.

10. The system as in claim 4, wherein the power plant comprises:
    a heat exchanger downstream from the combustor and upstream from the first heat exchanger of the condensation collection system; and
    a steam turbine in fluid communication with the heat exchanger.

11. The system as in claim 4, further comprising a controller and one or more moisture sensors coupled to the controller, wherein the one or more moisture sensors are disposed within the mixing chamber.

12. The system as in claim 11, wherein the condensation collection system further comprises a flow control valve upstream from the mixing chamber and in communication with the controller, wherein the controller actuates the flow control valves based at least in part on moisture content signals provided by the moisture sensors to the controller.

13. A power plant, comprising:
    a gas turbine having a compressor section, a combustor downstream from the compressor section, a fuel supply system in fluid communication with the combustor, and a turbine section downstream from the combustor;
    a condensation collection system having a first heat exchanger disposed downstream from an outlet of the turbine section and a condensate reservoir in fluid communication with the first heat exchanger, wherein the first heat exchanger condenses water vapor from combustion exhaust gases flowing from the turbine section into the condensate reservoir and provides a de-moisturized exhaust gas downstream from the first heat exchanger;
    an exhaust gas recirculation system including a first axial flow compressor disposed immediately downstream from the first heat exchanger, wherein the first axial flow compressor progressively compresses the de-moisturized exhaust gas and provides a compressed de-moisturized exhaust gas downstream of the first axial flow compressor; and
    a mixing chamber disposed downstream from the first axial flow compressor, in fluid communication with the condensate reservoir and in direct fluid communication with the combustor, wherein the compressed de-moisturized exhaust gas and the condensate from the condensate reservoir are mixed within the mixing chamber to provide a compressed re-moisturized exhaust gas directly to the combustor.

14. The power plant as in claim 13, further comprising an external water supply in fluid communication with at least one of the condensation collection system or the mixing chamber.

15. The power plant as in claim 13, wherein the condensation collection system comprises a second heat exchanger disposed downstream from the first axial flow compressor and upstream from the mixing Chamber, wherein the second heat exchanger is in fluid communication with the condensate reservoir.

16. The power plant as in claim 15, wherein the exhaust gas recirculation system further comprises a second axial flow compressor disposed downstream from the second heat exchanger and upstream from the mixing chamber.

17. The power plant as in claim 13, further comprising a fuel supply system downstream from the mixing chamber and upstream from the combustor, wherein the fuel supply system provides fluid communication between the mixing chamber and the combustor.

18. The power plant as in claim 13, wherein the power plant comprises:
- a heat exchanger downstream from the combustor and upstream from the first heat exchanger of the condensation collection system; and
- a steam turbine in fluid communication with the heat exchanger.

19. The power plant as in claim 13, further comprising a controller and one or more moisture sensors coupled to the controller, wherein the one or more moisture sensors are disposed within the mixing chamber.

20. The power plant as in claim 13, wherein the condensation collection system further comprises a flow control valve upstream from the mixing chamber and in communication with the controller, wherein the controller causes the flow control valves to actuate based at least in part on moisture content signals provided by the moisture sensors to the controller.

\* \* \* \* \*